April 8, 1930.  H. KOHLMAN  1,753,990

HINGE ATTACHMENT FOR KITCHEN UTENSILS

Original Filed Sept. 15, 1926

INVENTOR:
Henry Kohlman
BY David E. Carlsen
ATTORNEY

Patented Apr. 8, 1930

1,753,990

UNITED STATES PATENT OFFICE

HENRY KOHLMAN, OF ST. PAUL, MINNESOTA

HINGE ATTACHMENT FOR KITCHEN UTENSILS

Application filed September 15, 1926, Serial No. 135,567. Renewed September 6, 1929.

My invention relates to a cover hinge for coffee pots, kettles and other utensils submitted to heat. In such vessels it has heretofore been customary to provide a loose cover which is often unintentionally dropped upon the floor or stove. In other cases the cover is hinged in such a manner that when it is opened it will strike the bail or other handle of the vessel and drops back to closed position as the operator is tilting or otherwise handling the vessel.

The object of my invention is to provide a cover joint that will overcome the said difficulties and also hold the cover in any desired position.

Figure 1:
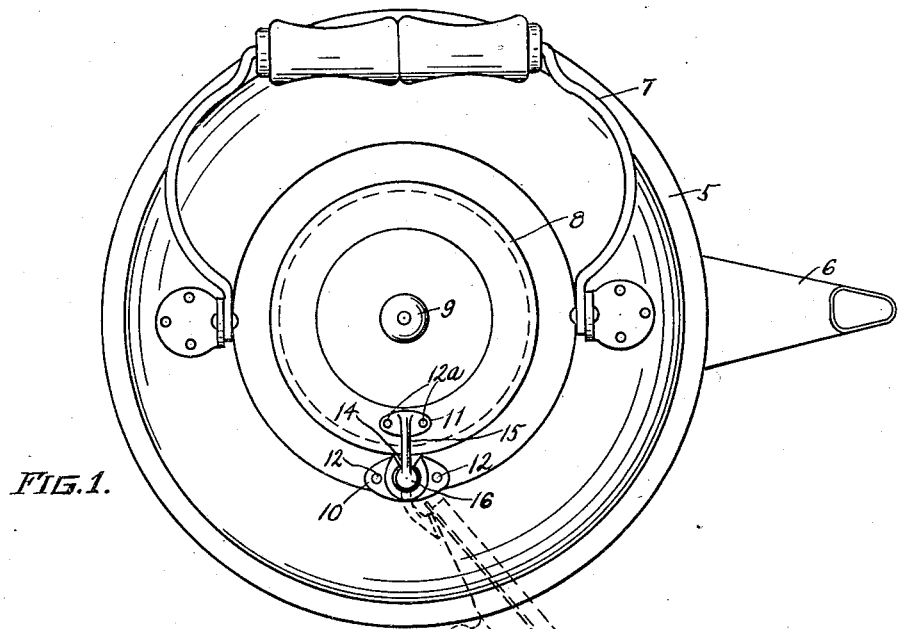
Fig. 1 is a top view of any type of kettle or the like equipped with my invention and showing the cover both in closed and in open position.
Figure 2:
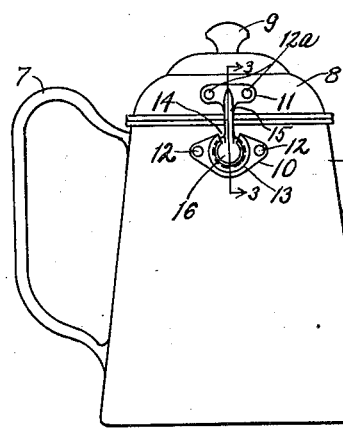
Fig. 2 is a side elevation of a coffee pot or like vessel equipped with my invention.

Referring to the drawing by reference numerals, 5 designates the body or top portion of a water kettle, tea-pot, coffee-pot or other vessel, having a spout 6 and handle 7, which latter may be of either the form shown in Fig. 1 or Fig. 2.

The middle of the top of the vessel is normally open but may be closed by a lid or cover 8 having a central knob 9 to be engaged when opening or closing the cover.

Said cover is hinged to the vessel by a ball-and-socket hinge composed of two members 10 and 11. The member 10 is secured on the vessel by screws 12 and has a ball socket 13 with a notch 14. The member 11 is similarly secured by screws 12ª to the cover and has a more or less curved goose-neck 15 swingable in the notch 14 and having a ball 16 fitting so snugly in the socket 13 that the cover will be held frictionally by the ball in any desired position.

In the operation, when it is desired to open the cover the knob 9 is grasped and the cover turned as to the position shown in dotted lines in Fig. 1 or any other suitable position where it will remain until the operator closes it again.

Figure 3:
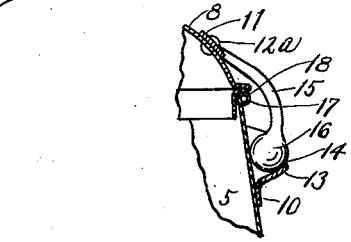
Fig. 3 is an enlarged section on the line 3—3 in Fig. 2, showing more clearly the detailed construction and arrangement of the hinge holding the cover.

The bead 17 and inlaid wire 18 in Fig. 3 are features used in forming the body 5 of various kinds of vessels. The screws 12 and 12ª are used for attaching the device to completed vessels but it is obvious that other fastening means such as rivets or spot welding may be employed where the manufacturer assembles complete vessels with the improved hinge included.

What I claim is:

In a utensil of the class described having a cover, a hinge member connecting the cover with the utensil and comprising a ball and socket joint of which the socket member is secured to the utensil in proximity to the said cover, said ball member engaged in said socket and including an arched integral arm extending toward and fixed to said cover at a point inwardly of the perimeter of the cover.

In testimony whereof I affix my signature.

HENRY KOHLMAN.